(12) United States Patent
Pohl et al.

(10) Patent No.: US 10,566,782 B2
(45) Date of Patent: Feb. 18, 2020

(54) SAFEGUARD OF A SUPPLY VOLTAGE

(71) Applicant: Beckhoff Automation GmbH, Verl (DE)

(72) Inventors: Christopher Pohl, Verl (DE); Thomas Rettig, Rheda-Wiedenbrück (DE); Johannes Künne, Rheda-Wiedenbrück (DE)

(73) Assignee: Beckhoff Automation GmbH, Verl (DE)

( * ) Notice: Subject to any disclaimer, the term of this patent is extended or adjusted under 35 U.S.C. 154(b) by 332 days.

(21) Appl. No.: 15/601,722

(22) Filed: May 22, 2017

(65) Prior Publication Data

US 2017/0338644 A1 Nov. 23, 2017

(30) Foreign Application Priority Data

May 23, 2016 (DE) .................. 10 2016 109 450

(51) Int. Cl.
*H02H 3/20* (2006.01)
*H02H 3/08* (2006.01)
*H01H 85/04* (2006.01)

(52) U.S. Cl.
CPC ............ *H02H 3/202* (2013.01); *H01H 85/04* (2013.01); *H02H 3/08* (2013.01)

(58) Field of Classification Search
CPC .......... H02H 3/202; H02H 3/08; H01H 85/04
See application file for complete search history.

(56) References Cited

U.S. PATENT DOCUMENTS

| | | | | |
|---|---|---|---|---|
| 3,852,656 | A * | 12/1974 | Bourbeau | H02M 1/38 363/58 |
| 8,242,370 | B2 * | 8/2012 | Tanba | H02G 3/0481 174/120 R |
| 2006/0291118 | A1 * | 12/2006 | Chen | H02H 9/042 361/91.1 |
| 2009/0045818 | A1 | 2/2009 | Male | |
| 2010/0277293 | A1 | 11/2010 | Yu et al. | |
| 2016/0064924 | A1 * | 3/2016 | Wiese | H04L 12/10 361/119 |

FOREIGN PATENT DOCUMENTS

DE 102012203828 A1 9/2013

* cited by examiner

*Primary Examiner* — Scott Bauer
(74) *Attorney, Agent, or Firm* — Dorsey & Whitney LLP

(57) ABSTRACT

A bus system comprises a feed module, a load module and a data cable connecting the feed module to the load module. A fuse is provided in an energy path and/or respectively in an energy/data transmission path between a feed module and a load module.

18 Claims, 4 Drawing Sheets

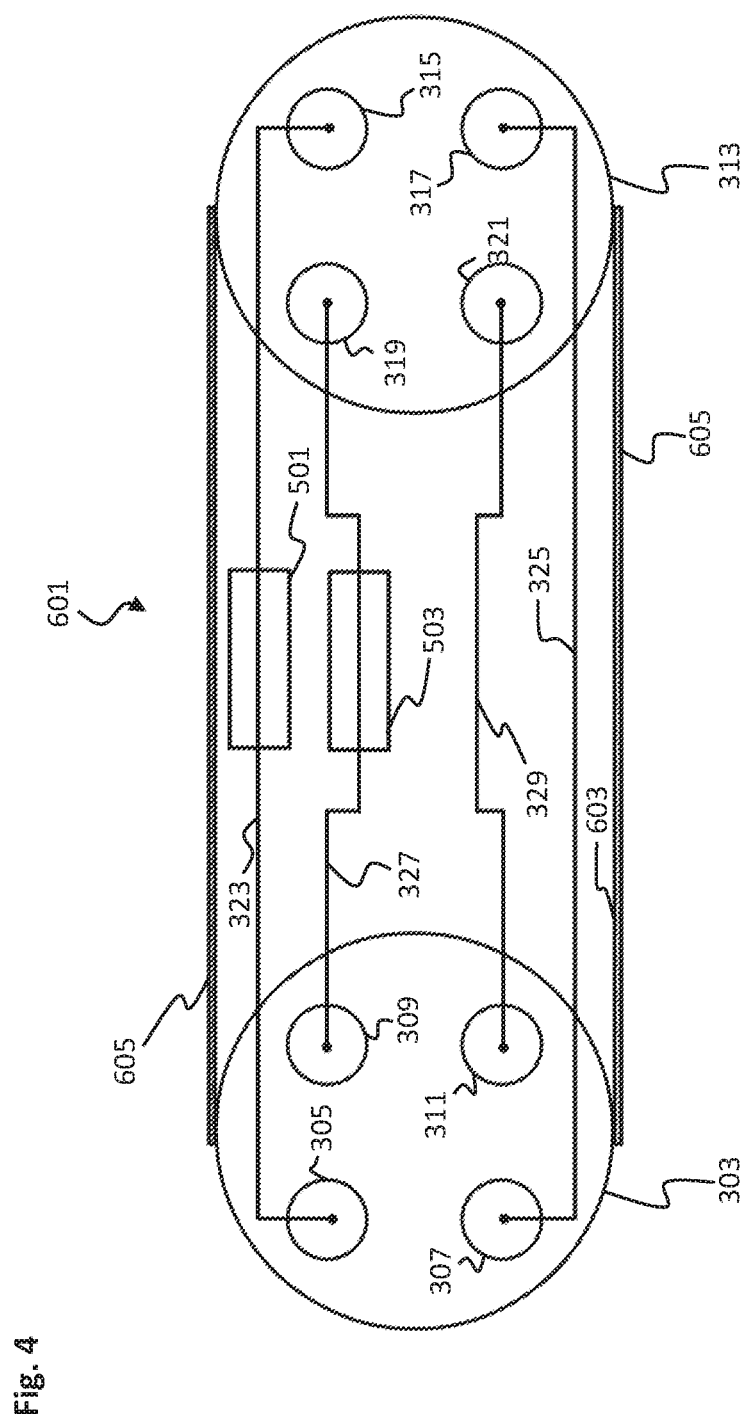

SAFEGUARD OF A SUPPLY VOLTAGE

CROSS-REFERENCE TO RELATED APPLICATION

This application claims priority to German patent application DE 10 2016 109 450.1, filed May 23, 2016, entitled KONZEPT EINER ABSICHERUNG EINER VERSORGUNGSSPANNUNG, the entire disclosure and content of which is hereby incorporated by reference herein, in the entirety and for all purposes.

FIELD

The invention relates to a feed module for a bus system, a load module for a bus system, a data cable for a bus system, and also a bus system.

BACKGROUND

In combined data and energy transmission systems, in general it is necessary to comply with all fundamental guidelines concerning energy supply lines, thus including the safeguarding of individual devices within the system.

The published patent application DE 10 2012 203 828 A1 discloses a power line communication system, wherein a fuse is connected in an automatic circuit breaker. A data signal may be coupled out upstream of the fuse from current-carrying lines via a high-pass filter and be inductively fed to a power line communication modem after the coupling-out. The modem may couple the data signal into the current-carrying lines again downstream of the fuse in a current-feeding direction.

What is disadvantageous about the known system, for example, is that the fuse has to be exchanged in a manner that incurs expenditure, if that is even possible at all with tenable expenditure, when it is necessary to safeguard an electrical device specified for a maximum current that is below a triggering threshold of the fuse.

Furthermore, two elements, the high-pass filter and the modem, are required for coupling the data signal out and in again, which increases a circuit complexity and means that material consumption is increased.

SUMMARY

It is an object to provide an improved feed module for a bus system, a load module for a bus system, an improved data cable for a bus system and an improved bus system which have a concept of an efficient safeguard of a supply voltage.

EXAMPLES

According to some aspects and examples, a feed module for a bus system can be provided, comprising one or more of:
  a first DC voltage source, and
  a terminal for a data cable,
  wherein the terminal comprises a first and a second contact, and
  wherein the first DC voltage source is connected to the first and second contacts via a first inductive assembly, such that a first electrical DC voltage can be applied to the first and second contacts by the first DC voltage source, and
  a physical interface for providing a first differential data signal,
  wherein the physical interface is connected to the first and second contacts via a first transformer and a first capacitive assembly, in order to apply a first differential data signal to the first contact and to the second contact, and
  wherein a fuse is respectively connected between the first DC voltage source and at least the first contact and/or the second contact.

According to further aspects and examples, a load module for a bus system is provided, comprising one or more of:
  a first DC voltage load, and
  a terminal for a data cable,
  wherein the terminal comprises a first and a second contact,
  wherein the first DC voltage load is connected to the first and second contacts via a first inductive assembly, such that the first DC voltage load may be supplied by a first electrical DC voltage applied to the first and second contacts,
  a physical interface for receiving a first differential data signal,
  wherein the physical interface is connected to the first and the second contacts via a first transformer and a first capacitive assembly, in order to receive a first differential data signal applied to the first contact and to the second contact,
  wherein a fuse is respectively connected between the first DC voltage load and at least the first contact and/or the second contact.

According other aspects, a data cable for a bus system is provided, comprising one or more of:
  a first connector part comprising a first contact and a second contact, and
  a second connector part comprising a first contact and a second contact,
  wherein the first contact of the first connector part is electrically conductively connected to the first contact of the second connector part by a first electrical conductor,
  wherein the second contact of the first connector part is electrically conductively connected to the second contact of the second connector part by a second electrical conductor,
  wherein a fuse is respectively connected between the first contact of the first connector part and the first contact of the second connector part and/or between the second contact of the first connector part and the second contact of the second connector part.

According other aspects, a bus system is provided, comprising one or more of:
  a feed module,
  a load module, and
  a data cable connecting the feed module to the load module,
  wherein at least the feed module is configured in accordance with the feed module for a bus system, and/or
  wherein at least the load module is configured in accordance with the load module for a bus system, and/or
  wherein at least the data cable is configured in accordance with the data cable for a bus system.

Some of above objects may be achieved by connecting a fuse between the first DC voltage source and the first DC voltage load. This affords the technical advantage, in particular, that an efficient safeguard of the supply voltage may be brought about. This is because if an impermissibly high current flows, for example, that is to say a current for which the load module or the data cable is not specified, the fuse will trigger and interrupt the electrical connection between the load module and the first DC voltage source. Damage in the load module, in the data cable and/or in the feed module may advantageously be avoided as a result.

The wording "a fuse is respectively connected between the first DC voltage source and at least the first contact and/or the second contact" thus encompasses the case, in particular, that a fuse is respectively connected both between the first DC voltage source and the first contact and between the first DC voltage source and the second contact. In particular, and/or wording encompasses the inclusive or generally, and specifically the case that a fuse is connected either between the first DC voltage source and the first contact or between the first DC voltage source and the second contact.

According to one embodiment of the feed module, it is provided that at least one of the respective fuse(s) is connected between the first DC voltage source and the first inductive assembly.

That is to say, therefore, that in accordance with this embodiment provision is made for connecting a fuse in an energy path of the feed module (DC voltage source to inductive assembly). As a result, in an advantageous manner, it is possible efficiently to prevent a situation in which an impermissibly high current may flow through the inductive assembly, insofar as already beforehand the fuse triggers and interrupts an electrical connection. As a result, for example, in an advantageous manner, damage to remote components, that is to say to components connected downstream of the inductive assembly, may be efficiently avoided. In particular, as a result, the inductive assembly itself may be protected against damage on account of an excessively high current.

In a further embodiment of the feed module, it is provided that a first circuit node is formed between the first capacitive assembly and the first contact, wherein a second circuit node is formed between the first capacitive assembly and the second contact, wherein the first inductive assembly is connected to the first circuit node and to the second circuit node, wherein at least one of the respective fuse(s) is connected between one of the two circuit nodes and the corresponding contact.

That is to say, therefore, that in accordance with this embodiment a fuse is connected in a common data/energy path of the feed module. This affords the technical advantage, for example, that in the feed module the energy path is not yet combined with the data signal, such that here a fuse type may be chosen regardless of the specific requirements of the differential data transmission.

According to a further embodiment of the feed module, it is provided that a bridging capacitor is connected in parallel with the fuse connected between said one of the two circuit nodes and the corresponding contact, in order, with the fuse having been triggered, to apply the first differential data signal to the corresponding contact via the bridging capacitor.

This affords the technical advantage, in particular, that even in the case of a fuse having been triggered, that is to say in the case of interrupted line, a communication with a load module connected to the feed module by a data cable is made possible via the bridging capacitor. That is to say, therefore, in particular, that even if DC voltage may no longer be made available to the load module, nevertheless it is still possible to communicate with the load module via the bridging capacitor.

According to one embodiment of the feed module, the capacitance of the bridging capacitor is 1 µF.

According to a further embodiment of the feed module, it is provided that a bridging capacitor connectable in parallel with the fuse connected between said one of the two circuit nodes and the corresponding contact is provided, wherein the fuse connected between said one of the two circuit nodes and the corresponding contact is configured, upon triggering, to connect the bridging capacitor in parallel, in order to apply the first differential data signal to the corresponding contact via the bridging capacitor.

This affords the technical advantage, in particular, that the bridging capacitor, if it had already been connected in parallel, may be prevented from having an influence on the first differential data signal. Consequently, the technical advantage is afforded, for example, that, in the case of the fuse not yet having been triggered, the bridging capacitor does not disturb a data transmission by the first differential data signal.

According to one embodiment of the feed module, a plurality of fuses are provided. The plurality of fuses are configured identically or differently, for example. In the case of a plurality of fuses, it is provided, for example, that, as explained above, a bridging capacitor is connected in parallel with said fuse, wherein a further bridging capacitor is provided, which, as explained above, is connectable in parallel with said further fuse, wherein said further fuse, as explained above, is configured, upon triggering, to connect the further bridging capacitor in parallel.

According to one embodiment of the load module, it is provided that at least one of the respective fuse(s) is connected between the first DC voltage load and the first inductive assembly.

This affords the technical advantage, in particular, that the first DC voltage load may be efficiently protected against an overload.

The wording "a fuse is respectively connected between the first DC voltage load and at least the first contact and/or the second contact" encompasses the case, in particular, that a fuse is respectively connected both between the first DC voltage load and the first contact and between the first DC voltage load and the second contact. In particular, this wording encompasses the case that a fuse is connected either between the first DC voltage load and the first contact or between the first DC voltage load and the second contact.

In a further embodiment of the load module, it is provided that a first circuit node is formed between the first capacitive assembly and the first contact, wherein a second circuit node is formed between the first capacitive assembly and the second contact, wherein the first inductive assembly is connected to the first circuit node and to the second circuit node, wherein at least one of the respective fuse(s) is connected between one of the two circuit nodes and the corresponding contact.

That is to say, therefore, that in accordance with this embodiment a fuse is connected in a common data/energy path of the load module. This may afford the technical advantage, for example, that a data cable to the load module may be specified for higher currents than the load module. This is because the load module comprises its own electrical safeguard.

In another embodiment of the load module, it is provided that a bridging capacitor is connected in parallel with the fuse connected between said one of the two circuit nodes and the corresponding contact, in order, with the fuse having been triggered, to apply the first differential data signal to the corresponding contact via the bridging capacitor.

This affords the technical advantage, in particular, that even in the case of the fuse having been triggered, that is to say in the case of an interrupted line, a communication with a feed module connected to the load module by a data cable is made possible via the bridging capacitor. That is to say, therefore, in particular, that even if the load module may no longer be supplied with a DC voltage, nevertheless it is still possible to communicate with the feed module via the bridging capacitor.

According to one embodiment of the load module, the capacitance of the bridging capacitor is 1 µF.

According to a further embodiment of the load module, it is provided that a bridging capacitor connectable in parallel with the fuse connected between said one of the two circuit nodes and the corresponding contact is provided, wherein the fuse connected between said one of the two circuit nodes and the corresponding contact is configured, upon triggering, to connect the bridging capacitor in parallel, in order to apply the first differential data signal to the corresponding contact via the bridging capacitor.

This affords the technical advantage, in particular, that the bridging capacitor, if it had already been connected in parallel, may be prevented from having an influence on the first differential data signal. Consequently, the technical advantage is afforded, for example, that, in the case of the fuse not yet having been triggered, the bridging capacitor does not disturb a data reception by the first differential data signal.

According to one embodiment of the load module, a plurality of fuses are provided. The plurality of fuses are configured identically or differently, for example. In the case of a plurality of fuses, it is provided, for example, that, as explained above, a bridging capacitor is connected in parallel with said fuse, wherein a further bridging capacitor is provided, which, as explained above, is connectable in parallel with said further fuse, wherein said further fuse, as explained above, is configured, upon triggering, to connect the further bridging capacitor in parallel.

In one embodiment of the data cable, it is provided that a bridging capacitor is connected in parallel with one of the respective fuse(s).

The explanations given in association with the corresponding embodiment of the feed module and respectively load module comprising a bridging capacitor connected in parallel are analogously applicable to this embodiment of the data cable. Reference may be made to the explanations correspondingly given.

In another embodiment of the data cable, it is provided that a bridging capacitor connectable in parallel with one of the respective fuse(s) is provided, wherein said one of the respective fuse(s) is configured, upon triggering, to connect the connectable bridging capacitor in parallel.

The explanations given in association with the corresponding embodiment of the feed module and respectively load module comprising a bridging capacitor connectable in parallel are analogously applicable to this embodiment of the data cable. Reference may be made to the explanations correspondingly given.

According to one embodiment of the data cable, the capacitance of the bridging capacitor is 1 µF.

In one embodiment of the data cable, it is provided that a cable sheath enveloping the two electrical conductors is provided, said cable sheath being encapsulated by an injection-molding material.

This affords the technical advantage, in particular, that the two electrical conductors are efficiently protected.

According to one embodiment of the feed module, a second DC voltage source is provided, wherein the terminal comprises a third and a fourth contact, wherein the second DC voltage source is connected to the third and fourth contacts via a second inductive assembly, such that a second electrical DC voltage may be applied to the third and fourth contacts by the second DC voltage source, wherein the physical interface is connected to the third and fourth contacts via a second transformer and a second capacitive assembly, in order to apply a second differential data signal to the third and fourth contacts, wherein a fuse is respectively connected between the second DC voltage source and at least the third contact and/or the fourth contact.

Providing a second DC voltage source affords the technical advantage, for example, that the feed module may make available a second DC voltage.

According to one embodiment of the feed module, it is provided that at least one of the respective fuse(s) is connected between the second DC voltage source and the second inductive assembly.

According to another embodiment of the feed module, it is provided that a third circuit node is formed between the second capacitive assembly and the first contact, wherein a fourth circuit node is formed between the second capacitive assembly and the second contact, wherein the second inductive assembly is connected to the third circuit node and to the fourth circuit node, wherein at least one of the respective fuse(s) is connected between one of the two circuit nodes and the corresponding contact.

According to another embodiment of the feed module, it is provided that a bridging capacitor is connected in parallel with the fuse connected between said one of the third and fourth circuit nodes and the corresponding contact, in order, with the fuse having been triggered, to apply the second differential data signal to the corresponding contact via the bridging capacitor.

In another embodiment of the feed module, it is provided that a bridging capacitor connectable in parallel with the fuse connected between said one of the third and fourth circuit nodes and the corresponding contact is provided. It is preferably provided that the fuse connected between said one of the third and fourth circuit nodes and the corresponding contact is configured, upon triggering, to connect the bridging capacitor in parallel, in order to apply the second differential data signal to the corresponding contact via the bridging capacitor.

In a further embodiment of the load module, it is provided that a second DC voltage load is provided, wherein the terminal comprises a third contact and a fourth contact, wherein the second DC voltage load is connected to the third and fourth contacts via a second inductive assembly, such that the second DC voltage load may be supplied by a second electrical DC voltage applied to the third and fourth contacts, wherein the physical interface is connected to the third and fourth contacts via a second transformer and a second capacitive assembly, in order to receive a second differential data signal applied to the third contact and to the fourth contact, wherein a fuse is respectively connected between the second DC voltage load and at least the third contact and/or the fourth contact.

In a further embodiment of the load module, it is provided that at least one of the respective fuse(s) is connected between the second DC voltage load and the second inductive assembly.

According to a further embodiment of the load module, it is provided that a third circuit node is formed between the second capacitive assembly and the third contact, wherein a fourth circuit node is formed between the second capacitive assembly and the fourth contact, wherein the second inductive assembly is connected to the third circuit node and to the fourth circuit node, wherein at least one of the respective fuse(s) is connected between one of the two circuit nodes and the corresponding contact.

In another embodiment of the load module, it is provided that a bridging capacitor is connected in parallel with the fuse connected between said one of the third and fourth circuit nodes and the corresponding contact, in order, with the fuse having been triggered, to apply the second differential data signal to the corresponding contact via the bridging capacitor.

In another embodiment of the load module, it is provided that a bridging capacitor connectable in parallel with the fuse connected between said one of the third and fourth circuit nodes and the corresponding contact is provided, wherein the fuse connected between said one of the third and fourth circuit nodes and the corresponding contact is configured, upon triggering, to connect the bridging capacitor in parallel, in order to apply the second differential data signal to the corresponding contact via the bridging capacitor.

In another embodiment of the data cable, it is provided that the first connector part comprises a third contact and a fourth contact, wherein the second connector part comprises a third contact and a fourth contact, wherein the third contact of the first connector part is electrically conductively connected to the third contact of the second connector part by a third electrical conductor, wherein the fourth contact of the first connector part is electrically conductively connected to the fourth contact of the second connector part by a fourth electrical conductor, wherein a fuse is respectively connected between the third contact of the first connector part and the third contact of the second connector part and/or between the fourth contact of the first connector part and the fourth contact of the second connector part.

In another embodiment of the data cable, it is provided that a cable sheath enveloping the four electrical conductors is provided, said cable sheath being encapsulated by an injection-molding material.

In embodiments of the data cable comprising the third and fourth electrical conductors, too, it is provided, for example, that a bridging capacitor is connected in parallel with one of the respective fuse(s) and/or respectively that a bridging capacitor connectable in parallel with one of the respective fuse(s) is provided, wherein said one of the respective fuse(s) is configured, upon triggering, to connect the connectable bridging capacitor in parallel.

That is to say that the concept of a fuse connected between the first DC voltage source and the first and/or respectively second contact of the feed module and/or respectively the concept of a fuse connected between the first contact and/or respectively the second contact and the first DC voltage load of the load module and/or respectively the concept of a fuse connected between the first contact and/or respectively the second contact of the first connector part and the first contact and/or respectively the second contact of the second connector part of the data cable may also be extended to embodiments which comprise a second DC voltage source and/or respectively a second DC voltage load and/or respectively a third and a fourth electrical conductor. The explanations correspondingly given in regard to the first DC voltage load and/or respectively the first DC voltage source are analogously applicable to the second DC voltage load and/or respectively the second DC voltage source.

The wording "and/or respectively" encompasses in particular the wording "and/or."

According to one embodiment, the bus system is configured for use in industrial automation. According to one embodiment, the bus system is thus a bus system of an industrial automation or a bus system for an industrial automation.

According to one embodiment of the bus system, the first differential data signal and/or respectively the second differential data signal are/is in each case differential Ethernet signal(s). The bus system and/or respectively the feed module and/or respectively the load module are/is therefore suitable in particular for use with Ethernet as a communication standard in the automation network.

According to one embodiment of the bus system, an automation network is provided which comprises the bus system.

According to one embodiment, the first differential data signal is an EtherCAT data signal.

In another embodiment, the second differential data signal is an EtherCAT data signal.

According to one embodiment of the data cable and/or respectively the feed module and/or respectively the load module, a fuse is connected exchangeably.

According to one embodiment of the data cable and/or respectively the feed module and/or respectively the load module, a fuse is connected fixedly. Fixedly means non-exchangeably.

According to one embodiment of the data cable and/or respectively the feed module and/or respectively the load module, the fuse is configured as a fusible link.

An electrical conductor may also be referred to as a core.

A contact can be for example an electrical contact pin or an electrical contact cup. The contacts of a connector part are configured identically or differently, for example. Mutually corresponding contacts of the first and second connector parts are configured identically or differently, for example.

A connector part can be for example a plug, in particular a built-in plug, or a socket or a coupling.

The first connector part and the second connector part can be configured identically or differently, for example.

An inductive assembly can comprise two inductances, for example.

A capacitive assembly can comprise two capacitors, for example.

A bridging capacitor can comprise a capacitance of 1 µF, for example.

In one embodiment of the feed module, the terminal is configured as a plug or as a socket.

In one embodiment of the load module, the terminal is configured as a plug or as a socket.

In one embodiment of the feed module and/or load module, an inductance can be an inductance of at least 3 µH, for example of 6.8 µH.

A DC voltage load can be an actuator or a sensor, for example.

A current at which a fuse triggers is for example 2 A, in particular 1 A, and/or respectively is greater than 2 A, in particular 1 A.

In one embodiment of the data cable and/or respectively the feed module and/or respectively the load module, the first contact or the second contact is connected to a ground potential via an inductance.

In one embodiment of the data cable and/or respectively the feed module and/or respectively the load module, the third contact or the fourth contact is connected to ground.

In one embodiment, the fuse is configured to communicate an instantaneous fuse state via a communication network. A fuse state is either "triggered" or "not triggered."

This affords the technical advantage, for example, that remotely there may be knowledge about whether the fuse has triggered or has not triggered. The fuse communicates for example via that electrical conductor in which it is connected. For example, the fuse comprises a wireless communication interface configured to transmit the instantaneous fuse state via a wireless communication network.

BRIEF DESCRIPTION OF THE DRAWINGS

The invention is explained in greater detail below on the basis of preferred exemplary embodiments with reference to figures, in which:

FIG. 4 shows a further data cable for a bus system.

Identical reference signs may be used hereinafter for identical features.

DETAILED DESCRIPTION

Figure 1:
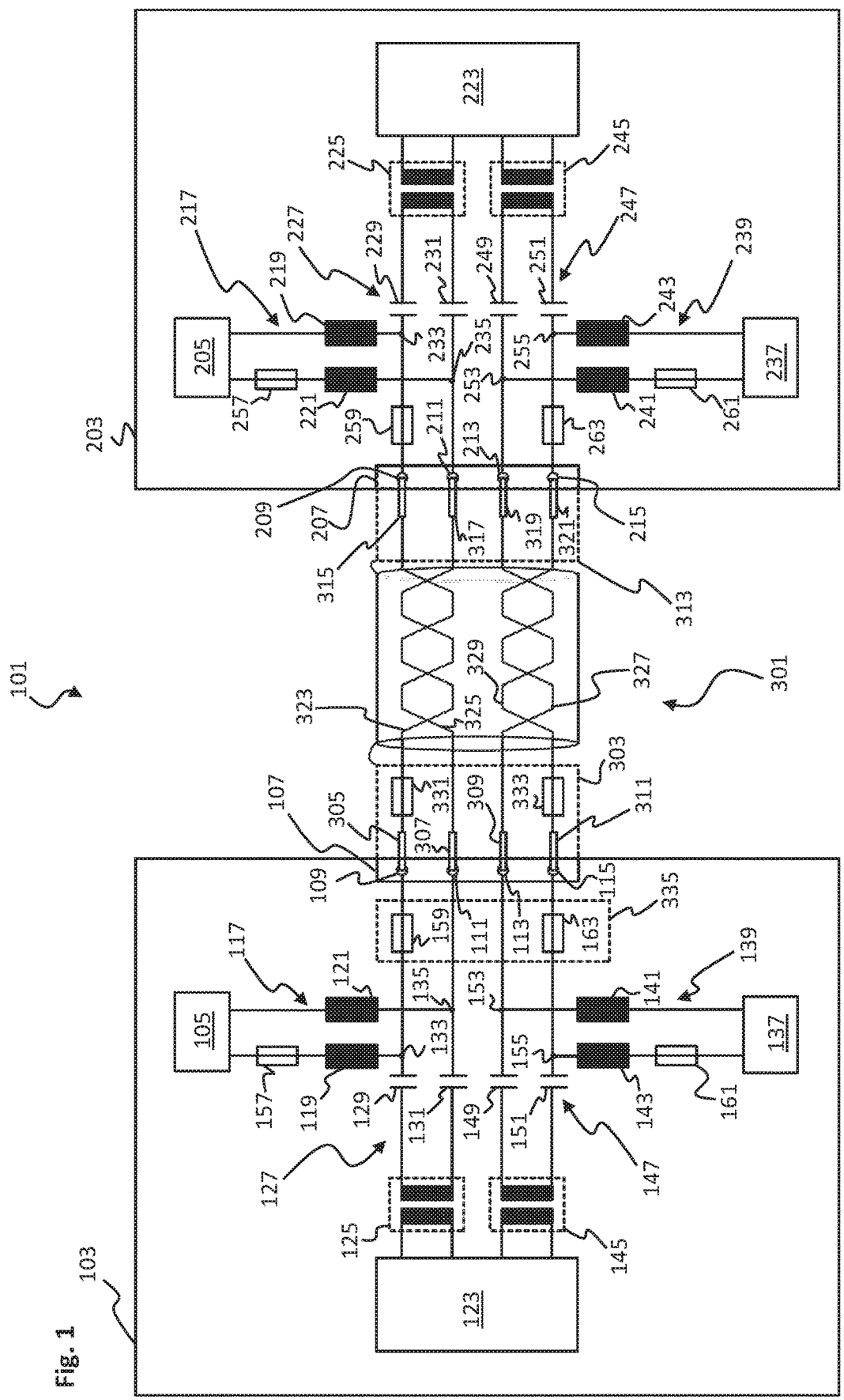
FIG. 1 shows a bus system.

FIG. 1 shows a bus system 101.

The bus system 101 comprises a feed module 103. The feed module 103 comprises a first DC voltage source 105. The feed module 103 furthermore comprises a terminal 107 for a data cable 301.

The terminal 107 comprises a first contact 109, a second contact 111, a third contact 113 and a fourth contact 115.

The feed module 103 furthermore comprises a first inductive assembly 117. The first DC voltage source 105 is connected to the first contact 109 and the second contact 111 of the terminal 107 by the first inductive assembly 117, in order to apply a first electrical DC voltage to the two contacts 109, 111.

The first inductive assembly 117 comprises a first inductance 119 and a second inductance 121.

The first inductance 119 of the first inductive assembly 117 is connected or arranged between the first DC voltage source 105 and the first contact 109 of the terminal 107.

The second inductance 121 of the first inductive assembly 117 is connected or arranged between the first DC voltage source 105 and the second contact 111 of the terminal 107.

The feed module 103 furthermore comprises a physical interface 123, which may also be referred to as a PHY.

The physical interface 123 is connected to the first contact 109 and the second contact 111 of the terminal 107 via a first transformer 125 and via a first capacitive assembly 127, such that the physical interface 123 may apply a first differential data signal to the two contacts 109, 111.

The first capacitive assembly 127 comprises a first capacitor 129 and a second capacitor 131.

The first capacitor 129 of the first capacitive assembly 127 is connected or arranged between the first transformer 125 and the first contact 109 of the terminal 107.

The second capacitor 131 of the first capacitive assembly 127 is connected or arranged between the first transformer 125 and the second contact 111 of the terminal 107.

A first circuit node 133 is formed between the first capacitor 129 of the first capacitive assembly 127 and the first contact 109 of the terminal 107.

A second circuit node 135 is formed between the second capacitor 131 of the capacitive assembly 127 and the second contact 111 of the terminal 107.

The first inductance 119 of the first inductive assembly 117 is connected to the first circuit node 133.

The second inductance 121 of the first inductive assembly 117 is connected to the second circuit node 135.

The feed module 103 furthermore comprises a second DC voltage source 137, which is connected to the third contact 113 and the fourth contact 115 of the terminal 107 via a second inductive assembly 139, in order to apply a second electrical DC voltage to the third contact 113 and to the fourth contact 115 of the terminal 107.

The second inductive assembly 139 comprises a third inductance 141 and a fourth inductance 143.

The third inductance 141 of the second inductive assembly 139 is arranged or connected between the third contact 113 of the terminal 107 and the second DC voltage source 137.

The fourth inductance 143 of the second inductive assembly 139 is connected or arranged between the second DC voltage source 137 and the fourth contact 115 of the terminal 107.

The feed module 103 furthermore comprises a second transformer 145 and also a second capacitive assembly 147.

The physical interface 123 is connected to the third contact 113 and the fourth contact 115 of the terminal 107 via the second transformer 145 and the second capacitive assembly 147, in order to apply a second differential data signal to the third contact 113 and to the fourth contact 115 of the terminal 107.

The second capacitive assembly 147 comprises a third capacitor 149 and a fourth capacitor 151.

The third capacitor 149 of the second capacitive assembly 147 is connected or arranged between the second transformer 145 and the third contact 113 of the terminal 107.

The fourth capacitor 151 of the second capacitive assembly 147 is connected or arranged between the second transformer 145 and the fourth contact 115 of the terminal 107.

A third circuit node 153 is formed between the third capacitor 149 of the second capacitive assembly 147 and the third contact 113 of the terminal 107.

A fourth circuit node 155 is formed between the fourth capacitor 151 of the second capacitive assembly 147 and the fourth contact 115 of the terminal 107.

The third inductance 141 of the second inductive assembly 139 is connected to the third circuit node 153.

The fourth inductance 143 of the second inductive assembly 139 is connected to the fourth circuit node 155.

The first capacitor 129 and the second capacitor 131 of the first capacitive assembly 127 block the first electrical DC voltage provided by the first DC voltage source 105, such that said voltage is not present at the first transformer 125.

The third capacitor 149 and the fourth capacitor 151 of the second capacitive assembly 147 block the second electrical DC voltage provided by the second DC voltage source 137, such that said voltage is not present at the second transformer 145.

The first inductance 119 and the second inductance 121 of the first inductive assembly 117 block the first differential data signal in a line section between the first circuit node 133 and/or respectively second circuit node 135 and the first DC voltage source 105.

The third inductance 141 and the fourth inductance 143 of the second inductive assembly 139 block the second differential data signal between the third circuit node 153 and/or respectively fourth circuit node 155 and the second DC voltage source 137.

What is thus advantageously made possible is that both two DC voltages and two differential data signals may be applied to the four contacts 109, 111, 113, 115 of the terminal 107.

In order to electrically safeguard application of these electrical DC voltages, according to one embodiment it is provided that a fuse is connected between the first DC voltage source 105 and the first contact 109 and/or respectively the second contact 111 of the terminal 107.

In one embodiment, it is provided that a fuse is connected between the second DC voltage source 137 and the third contact 113 and/or respectively fourth contact 115 of the terminal 107.

By way of example, it is provided that a fuse 157 is connected between the first DC voltage source 105 and the first inductance 119 of the first inductive assembly 117.

By way of example, it is provided that a fuse 159 is connected between the first circuit node 133 and the first contact 109 of the terminal 107.

By way of example, it is provided that a fuse 161 is connected between the second DC voltage source 137 and the fourth inductance 143 of the second inductive assembly 139.

By way of example, it is provided that a fuse 163 is connected between the fourth circuit node 155 and the fourth contact 115 of the terminal 107.

Although all four fuses 157, 159, 161, 163 are provided in the exemplary embodiment shown in FIG. 1, in an exemplary embodiment it is provided that either only the fuse 157 or only the fuse 159 is connected between the first DC voltage source 105 and the first contact 109, wherein only the fuse 161 or only the fuse 163 is connected between the second DC voltage source 137 and the fourth contact 115.

In a further exemplary embodiment, it is provided that in addition to or instead of the fuse 157 and/or respectively 159, a fuse is connected between the first DC voltage source 105 and the second contact 111.

In a further exemplary embodiment, it is provided that in addition to or instead of the fuse 161 and/or respectively 163, a fuse is connected between the second DC voltage source 137 and the third contact 113.

That is to say, therefore, in particular, that in a further exemplary embodiment, a fuse is connected between the first DC voltage source 105 and the second inductance 121 of the first inductive assembly 117 and/or respectively between the second circuit node 135 and the second contact 111 of the terminal 107.

That is to say, therefore, in particular, that in a further exemplary embodiment, it is provided that a fuse is connected between the second DC voltage source 137 and the third inductance 141 and/or respectively between the third circuit node 153 and the third contact 113 of the terminal 107.

Figure 2:
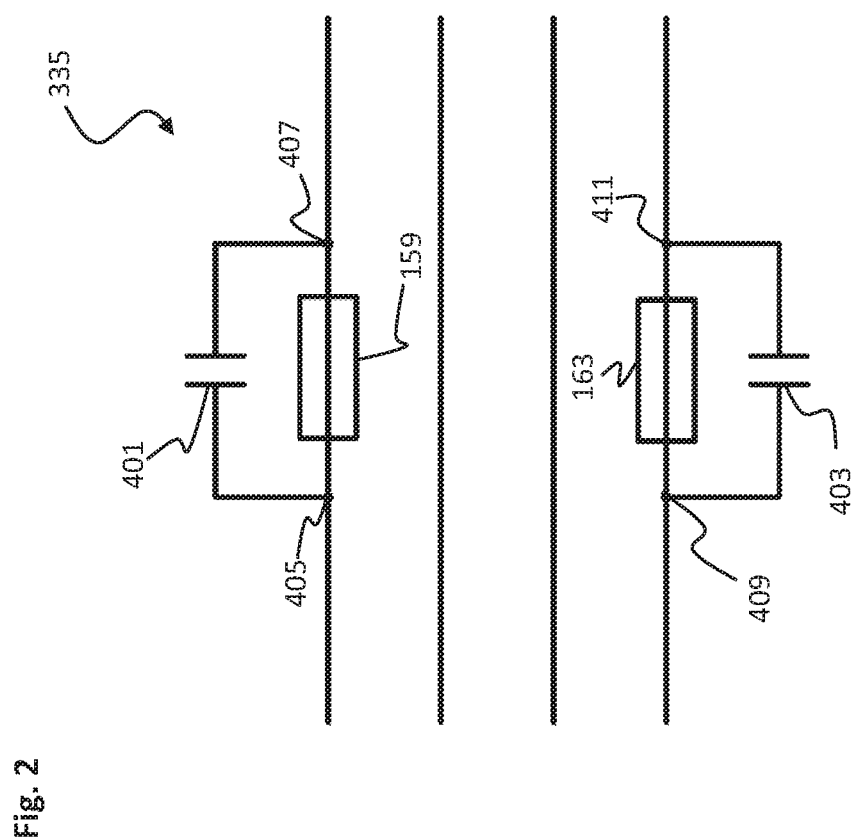
FIG. 2 shows an enlarged excerpt from the bus system in FIG. 1.

The reference sign 335 points to a region of the feed module 103 which is demarcated in a dashed manner and which is illustrated in an enlarged view in FIG. 2 for an alternative exemplary embodiment of the feed module 103.

The bus system 101 furthermore comprises a load module 203.

The load module 203 comprises a first DC voltage load 205. The load module 203 furthermore comprise a terminal 207 for a data cable.

The terminal 207 comprises a first contact 209, a second contact 211, a third contact 213 and a fourth contact 215.

The load module 203 furthermore comprises a first inductive assembly 217. The first DC voltage load 205 is connected to the first contact 209 and the second contact 211 of the terminal 207 by the first inductive assembly 217, in order to be supplied by a first electrical DC voltage applied to the first contact 209 and the second contact 211 of the terminal 207.

The first inductive assembly 217 comprises a first inductance 219 and a second inductance 221.

The first inductance 219 of the first inductive assembly 217 is connected or arranged between the first DC voltage load 205 and the first contact 209 of the terminal 207.

The second inductance 221 of the first inductive assembly 217 is connected or arranged between the first DC voltage load 205 and the second contact 211 of the terminal 207.

The load module 203 furthermore comprises a physical interface 223, which may also be referred to as a PHY.

The physical interface 223 is connected to the first contact 209 and the second contact 211 of the terminal 207 via a first transformer 225 and via a first capacitive assembly 227, such that the physical interface 223 may receive a first differential data signal applied to the two contacts 209, 211.

The first capacitive assembly 227 comprises a first capacitor 229 and a second capacitor 231.

The first capacitor 229 of the first capacitive assembly 227 is connected or arranged between the first transformer 225 and the first contact 209 of the terminal 207.

The second capacitor 231 of the first capacitive assembly 227 is connected or arranged between the first transformer 225 and the second contact 211 of the terminal 207.

A first circuit node 233 is formed between the first capacitor 229 of the first capacitive assembly 227 and the first contact 209 of the terminal 207.

A second circuit node 235 is formed between the second capacitor 231 of the first capacitive assembly 227 and the second contact 211 of the terminal 207.

The first inductance 219 of the first inductive assembly 217 is connected to the first circuit node 233.

The second inductance 221 of the first inductive assembly 217 is connected to the second circuit node 235.

The load module 203 furthermore comprises a second DC voltage load 237, which is connected to the third contact 213 and the fourth contact 215 of the terminal 207 via a second inductive assembly 239, in order to be supplied by a second electrical DC voltage applied to the third contact 213 and the fourth contact 215 of the terminal 207.

The second inductive assembly 239 comprises a third inductance 241 and a fourth inductance 243.

The third inductance 241 of the second inductive assembly 239 is arranged or connected between the third contact 213 of the terminal 207 and the second DC voltage load 237.

The fourth inductance 243 of the second inductive assembly 239 is connected or arranged between the second DC voltage load 237 and the fourth contact 215 of the terminal 207.

The load module 203 furthermore comprises a second transformer 245 and also a second capacitive assembly 247.

The physical interface 223 is connected to the third contact 213 and the fourth contact 215 of the terminal 207 via the second transformer 245 and the second capacitive assembly 247, such that the physical interface 223 may receive a second differential data signal applied to the two contacts 213, 215.

The second capacitive assembly 247 comprises a third capacitor 249 and a fourth capacitor 251.

The third capacitor 249 of the second capacitive assembly 247 is connected or arranged between the second transformer 245 and the third contact 213 of the terminal 207.

The fourth capacitor 251 of the second capacitive assembly 247 is connected or arranged between the second transformer 245 and the fourth contact 215 of the terminal 207.

A third circuit node 253 is formed between the third capacitor 249 of the second capacitive assembly 247 and the third contact 213 of the terminal 207.

A fourth circuit node 255 is formed between the fourth capacitor 251 of the second capacitive assembly 247 and the fourth contact 215 of the terminal 207.

The third inductance 241 of the second inductive assembly 239 is connected to the third circuit node 253.

The fourth inductance 243 of the second inductive assembly 239 is connected to the fourth circuit node 255.

The first capacitor 229 and the second capacitor 231 of the first capacitive assembly 227 block the first electrical DC voltage, such that the latter is not present at the first transformer 225.

The third capacitor 249 and the fourth capacitor 251 of the second capacitive assembly 247 block the second electrical DC voltage, such that the latter is not present at the second transformer 245.

The first inductance 219 and the second inductance 221 of the first inductive assembly 217 block the first differential data signal in a line section between the first circuit node 233 and/or respectively the second circuit node 235 and the first DC voltage load 205.

The third inductance 241 and the fourth inductance 243 of the second inductive assembly 239 block the second differential data signal between the third circuit node 253 and/or respectively the fourth circuit node 255 and the second DC voltage load 237.

What is thus advantageously made possible is that the load module 203 firstly may be supplied with two DC voltages via the four contacts 209, 211, 213, 215 of the terminal 207. Secondly, what is advantageously made possible is that it is possible to communicate with the load module via the four contacts 209, 211, 213, 215 by two differential data signals.

In order to electrically safeguard the applied electrical DC voltages, according to one embodiment it is provided that a fuse is connected between the first DC voltage load 205 and the first contact 209 and/or respectively the second contact 211 of the terminal 207.

In one embodiment, it is provided that a fuse is connected between the second DC voltage load 237 and the third contact 213 and/or respectively fourth contact 215 of the terminal 207.

By way of example, it is provided that a fuse 257 is connected between the first DC voltage load 205 and the second inductance 221 of the first inductive assembly 217.

By way of example, it is provided that a fuse 259 is connected between the first circuit node 233 and the first contact 209 of the terminal 207.

By way of example, it is provided that a fuse 261 is connected between the second DC voltage load 237 and the third inductance 241 of the second inductive assembly 239.

By way of example, it is provided that a fuse 263 is connected between the fourth circuit node 255 and the fourth contact 215 of the terminal 207.

Although all four fuses 257, 259, 261, 263 are provided in the exemplary embodiment shown in FIG. 1, in an exemplary embodiment, it is provided that either only the fuse 257 or only the fuse 259 is connected between the first DC voltage load 205 and the first contact 209, wherein only the fuse 261 or only the fuse 263 is connected between the second DC voltage load 237 and the fourth contact 215.

In a further exemplary embodiment, it is provided that in addition to or instead of the fuse 257 and/or respectively 259, a fuse is connected between the first DC voltage load 205 and the second contact 211.

In a further exemplary embodiment, it is provided that in addition to or instead of the fuse 261 and/or respectively 263, a fuse is connected between the second DC voltage load 237 and the third contact 213.

That is to say, therefore, in particular, that in a further exemplary embodiment, a fuse is connected between the first DC voltage load 205 and the second inductance 221 of the first inductive assembly 217 and/or respectively between the second circuit node 235 and the third contact 211 of the terminal 207.

That is to say, therefore, in particular, that in a further exemplary embodiment, it is provided that a fuse is connected between the second DC voltage load 237 and the third inductance 241 and/or respectively between the third circuit node 253 and the third contact 213 of the terminal 207.

The bus system 101 furthermore comprises a data cable 301. The data cable 301 comprises a first connector part 303. The first connector part 303 comprises a first contact 305, a second contact 307, a third contact 309 and a fourth contact 311.

The data cable 301 comprises a second connector part 313. The second connector part 313 comprises a first contact 315, a second contact 317, a third contact 319 and a fourth contact 321.

The first contact 305 of the first connector part 303 is electrically conductively connected to the first contact 315 of the second connector part 313 by a first electrical conductor 323.

The second contact 307 of the first connector part 303 is electrically conductively connected to the second contact 317 of the second connector part 313 by a second electrical conductor 325.

The third contact 309 of the first connector part 303 is electrically conductively connected to the third contact 319 of the second connector part 313 by a third electrical conductor 327.

The fourth contact 311 of the first connector part 303 is electrically conductively connected to the fourth contact 321 of the second connector part 313 by a fourth electrical conductor 329.

The four electrical conductors 323, 325, 327, 329 may be referred to as cores, for example.

The first electrical conductor 323 and the second electrical conductor 325 are twisted.

The third electrical conductor 327 and the fourth electrical conductor 329 are twisted.

That is to say, therefore, that the first electrical conductor 323 and the second electrical conductor 325 form a first twisted core pair.

That is to say, therefore, in particular, that the third electrical conductor 327 and the fourth electrical conductor 329 form a second twisted core pair.

In an embodiment, it is provided that the four electrical conductors 323, 325, 327, 329 are not twisted, that is to say are non-twisted.

The first connector part 303 is configured in such a way that it may be plugged into the terminal 107 of the feed module 103. In the plugged state, the first contact 305 of the first connector part 303 contacts the first contact 109 of the terminal 107. In the plugged state, the second contact 307 of the first connector part 303 contacts the second contact 111 of the terminal 107. In the plugged state, the third contact 309 of the first connector part 303 contacts the third contact 113 of the terminal 107. In the plugged state, the fourth contact 311 of the first connector part 303 contacts the fourth contact 115 of the terminal 107.

The second connector part 313 is configured in such a way that it may be plugged into the terminal 207 of the load module 203. In the plugged state, the first contact 315 of the second connector part 313 contacts the first contact 209 of the terminal 207. In the plugged state, the second contact 317 of the second connector part 313 contacts the second contact 211 of the terminal 207. In the plugged state, the third contact 319 of the second connector part 313 contacts the third contact 213 of the terminal 207. In the plugged state, the fourth contact 321 of the second connector part 313 contacts the fourth contact 215 of the terminal 207.

What is thus advantageously made possible is that the first electrical DC voltage and the first differential data signal may be transmitted from the feed module 103 to the load module 203 by the first twisted core pair, that is to say by the first electrical conductor 323 and the second electrical conductor 325.

What is thus furthermore advantageously made possible is that the second electrical DC voltage and the second differential data signal can be transmitted from the feed module 103 to the load module 203 by the second twisted core pair, that is to say by the third electrical conductor 327 and the fourth electrical conductor 329.

For safeguarding the applied DC voltages, it is provided, for example, that a fuse 331 is connected between the first contact 305 of the first connector part 303 and the first contact 315 of the second connector part 313.

By way of example, it is provided that a fuse 333 is connected between the fourth contact 311 of the first connector part 303 and the fourth contact 321 of the second connector part 313.

Providing such a data cable 301 thus advantageously makes it possible that a safeguard of the applied DC voltages need no longer be provided in the feed module 103. The safeguard is thus advantageously transferred to the data cable 301.

In exemplary embodiments that are not shown, it is provided that the data cable 301 is free of fuses 331, 333. This is because if the feed module 103 already comprises corresponding fuses for safeguarding the applied DC voltages, then the data cable 301 need no longer provide for such a safeguard.

In exemplary embodiments that are not shown, it is provided that the load module 203 is free of fuses 257, 259, 261, 263. This is because if, for example, the data cable 301 and/or respectively the feed module 103 are/is already provided with corresponding fuses, a safeguard in the supplied device 203, that is to say here the load module 203, is no longer necessary.

The feed module 103, the load module 203 and the data cable 301 are disclosed in each case by themselves.

In an alternative embodiment of the feed module 103, the region 335 from FIG. 1, as described below, comprises a bridging capacitor 401.

The fuse 159 connected between the first circuit node 133 and the first contact 109 is connected in parallel with a first bridging capacitor 401. That is to say, therefore, that a first bridging capacitor 401 is provided, which is connected in parallel with the fuse 159.

That is to say, therefore, in particular, that a fifth circuit node 405 and a sixth circuit node 407 are formed, wherein the fuse 159 is connected between the fifth circuit node 405 and the sixth circuit node 407, wherein the first bridging capacitor 401 is connected to the fifth circuit node 405 and the sixth circuit node 407.

The fifth circuit node 405 may correspond for example to the first circuit node 133.

If the fuse 159 triggers, that is to say if, for example, an excessively high current flows which leads to a triggering of the fuse 159, then although it is no longer possible to transmit a first DC voltage, nevertheless what is advantageously made possible is that the first differential data signal may continue to be applied to the first contact 109 of the terminal 107 via the first bridging capacitor 401. That is to say, therefore, in particular, that although a first electrical DC voltage may no longer be transmitted via the first twisted core pair, nevertheless via the first bridging capacitor 401 the first differential data signal may still be transmitted via the first twisted core pair.

The first bridging capacitor 401 comprises a capacitance of 1 µF, for example.

In the embodiment shown in FIG. 1, the feed module 103 is free of the first bridging capacitor 401.

Analogously to the fuse 159, a second bridging capacitor 403 is also connected in parallel with the fuse 163, that is to say with the fuse connected between the fourth circuit node 155 and the fourth contact 115.

That is to say, therefore, in particular, that a seventh circuit node 409 and an eighth circuit node 411 are formed. The fuse 163 is arranged between the seventh circuit node 409 and the eighth circuit node 411. The seventh circuit node 409 may correspond for example to the fourth circuit node 155.

The second bridging capacitor 403 is connected to the seventh circuit node 409 and the eighth circuit node 411.

The capacitance of the second bridging capacitor 403 is 1 µF, for example.

Consequently, what is thus advantageously made possible is that, upon the fuse 163 being triggered, that is to say upon an impermissibly high current flowing which leads to the triggering of the fuse 163, although it is no longer possible to transmit the second electrical DC voltage, nevertheless transmission of the second differential data signal is still made possible via the second bridging capacitor 403. That is to say, therefore, in particular, that although a second electrical DC voltage may no longer be transmitted via the second twisted core pair, nevertheless via the second bridging capacitor 403 the second differential data signal may still be transmitted via the second twisted core pair.

In the embodiment shown in FIG. 1, it is provided that the feed module 103 is free of the second bridging capacitor 403.

Analogously to the fuses 159, 163, in a further embodiment, it is provided that the fuses 259, 263 (or only one of the two fuses 259, 263) of the load module 203 may also be correspondingly bridged by a bridging capacitor. The explanations given in association with the feed module 103 are analogously applicable to the load module 203.

In a further exemplary embodiment, it is provided that the fuses 331, 333 (or only one of the two fuses 331, 333) of the data cable 301 may be bridged with a corresponding bridging capacitor analogously to the fuses 159, 163. The explanations given in association with the feed module 103 regarding the first bridging capacitor 401 and the second bridging capacitor 403 are analogously applicable to bridging of the fuses 331, 333 of the data cable 301.

In the data cable 301 in accordance with FIG. 1, the fuses 331, 333 were provided in the first connector part 303. In an embodiment, it is provided that the fuses 331, 333 are provided in the second connector part 313.

Figure 3:
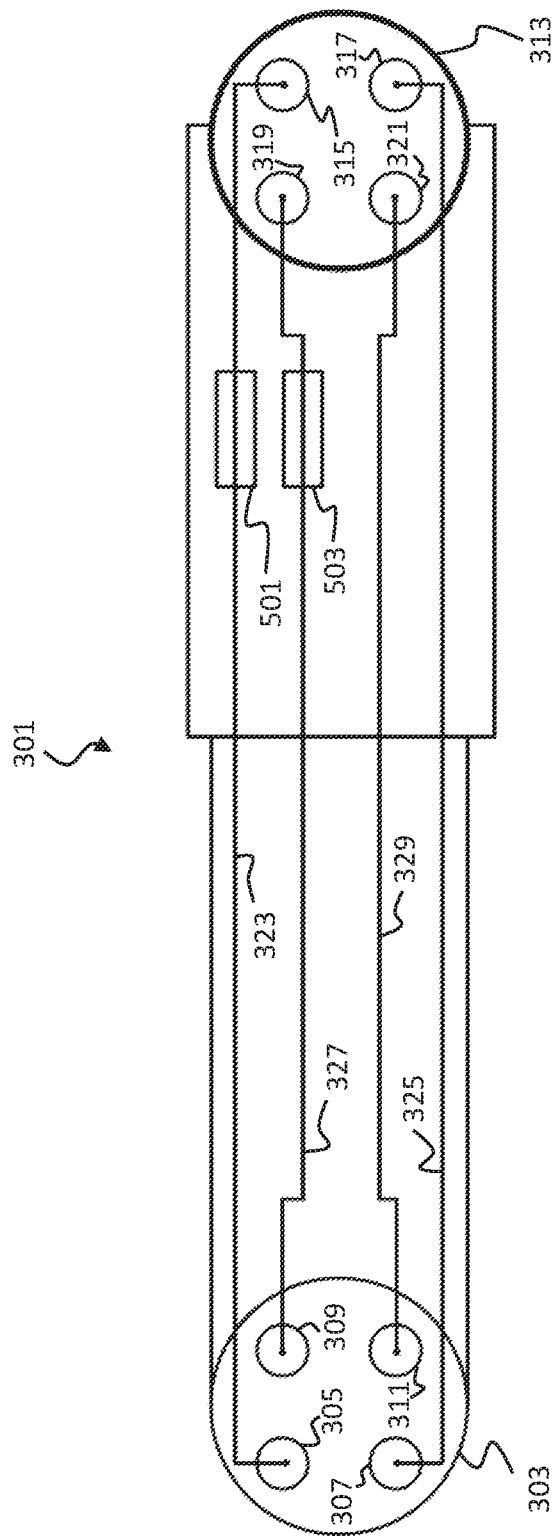
FIG. 3 shows a data cable for a bus system.

In the embodiment of a data cable 301 as shown in FIG. 3, it is provided that, instead of the fuses 331, 333, fuses 501, 503 are connected in the electrical conductors themselves.

That is to say, therefore, that in accordance with the embodiment of a data cable 301 as shown in FIG. 3, a fuse 501 is connected in the first electrical conductor 323. A fuse 503 is likewise connected in the third electrical conductor 327.

Analogously to the embodiment shown in FIG. 2, in a further embodiment, it is provided that the fuses 501 and 503 may be bridged by a bridging capacitor. The explanations given in association with FIG. 2 are analogously applicable to the data cable 301 in FIG. 3.

Analogously to the description concerning FIG. 1, the electrical conductors 332 and 325 of the data cable 301 illustrated in FIG. 3 may form a first twisted core pair and the electrical conductors 327 and 329 of the data cable 301 illustrated in FIG. 3 may form a second twisted core pair.

FIG. 4 shows a further data cable 601. The data cable 601 is configured substantially analogously to the data cable 301 in FIG. 3. Reference may be made to the explanations correspondingly given.

Furthermore, the data cable 601 comprises a cable sheath 603, within which the four electrical conductors 323, 325, 327, 329 run.

The cable sheath 603 is encapsulated by an injection-molding material 605.

That is to say, therefore, in particular, that a rigid connection between the first connector part 303 and the second connector part 313 is formed by the injection-molding material 605 applied as encapsulation by injection molding.

This advantageously brings about a simple handling of the data cable 601.

The data cable 601 may be used for example instead of the data cable 301 of the bus system 101 in FIG. 1. That is to say, therefore, in particular, that provision is made for the data cable 601 to be plugged by the first connector part 303 into the terminal 107 of the feed module 103. A further data cable may then be plugged onto the second connector part 315 of the data cable 601 in order to connect the data cable 601 to the load module 203, wherein the further data cable itself then need no longer comprise any fuses, insofar as these fuses are already present in the data cable 601.

To summarize, a fuse is provided in the energy path and/or respectively in the energy/data transmission path between a feed module and a load module. By way of example, a capacitor is connected in parallel with said fuse and/or respectively a capacitor may be connected in parallel therewith. This advantageously makes it possible, therefore, still to maintain a communication between the feed module and the load module even in the event of triggering of the fuse.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

What is claimed is:

1. A feed module for a bus system, comprising:
a first DC voltage source,
a terminal for a data cable,
wherein the terminal comprises a first and a second contact,
wherein the first DC voltage source is connected to the first and second contacts via a first inductive assembly, such that a first electrical DC voltage can be applied to the first and second contacts by the first DC voltage source,
a physical interface for providing a first differential data signal,
wherein the physical interface is connected to the first and second contacts via a first transformer and a first capacitive assembly, in order to apply a first differential data signal to the first contact and to the second contact,
wherein a fuse is respectively connected between the first DC voltage source and at least the first contact and/or the second contact, and
wherein a bridging capacitor is provided in parallel with the fuse to bridge the fuse when the fuse having been triggered.

2. The feed module according to claim 1, wherein at least one of the respective fuse(s) is connected between the first DC voltage source and the first inductive assembly.

3. The feed module according to claim 1, wherein a first circuit node is formed between the first capacitive assembly and the first contact, wherein a second circuit node is formed between the first capacitive assembly and the second contact, wherein the first inductive assembly is connected to the first circuit node and to the second circuit node, wherein at least one of the respective fuse(s) is connected between one of the two circuit nodes and the corresponding contact.

4. The feed module according to claim 3, wherein the bridging capacitor is connected in parallel with the fuse connected between said one of the two circuit nodes and the corresponding contact, in order, with the fuse having been triggered, to apply the first differential data signal to the corresponding contact via the bridging capacitor.

5. The feed module according to claim 3, wherein the bridging capacitor connectable in parallel with the fuse connected between said one of the two circuit nodes and the corresponding contact is provided, wherein the fuse connected between said one of the two circuit nodes and the corresponding contact is configured, upon triggering, to connect the bridging capacitor in parallel, in order to apply the first differential data signal to the corresponding contact via the bridging capacitor.

6. A load module for a bus system, comprising:
a first DC voltage load,
a terminal for a data cable,
wherein the terminal comprises a first and a second contact,
wherein the first DC voltage load is connected to the first and second contacts via a first inductive assembly, such that the first DC voltage load may be supplied by a first electrical DC voltage applied to the first and second contacts,
a physical interface for receiving a first differential data signal,
wherein the physical interface is connected to the first and the second contacts via a first transformer and a first capacitive assembly, in order to receive a first differential data signal applied to the first contact and to the second contact,
wherein a fuse is respectively connected between the first DC voltage load and at least the first contact and/or the second contact, and
wherein a bridging capacitor is provided in parallel with the fuse to bridge the fuse when the fuse having been triggered.

7. The load module according to claim 6, wherein at least one of the respective fuse(s) is connected between the first DC voltage load and the first inductive assembly.

8. The load module according to claim 6, wherein a first circuit node is formed between the first capacitive assembly and the first contact, wherein a second circuit node is formed between the first capacitive assembly and the second contact, wherein the first inductive assembly is connected to the first circuit node and to the second circuit node, wherein at least one of the respective fuse(s) is connected between one of the two circuit nodes and the corresponding contact.

9. The load module according to claim 8, wherein a bridging capacitor is connected in parallel with the fuse connected between said one of the two circuit nodes and the corresponding contact, in order, with the fuse having been triggered, to apply the first differential data signal to the corresponding contact via the bridging capacitor.

10. The load module according to claim 8, wherein a bridging capacitor connectable in parallel with the fuse connected between said one of the two circuit nodes and the corresponding contact is provided, wherein the fuse connected between said one of the two circuit nodes and the corresponding contact is configured, upon triggering, to connect the bridging capacitor in parallel, in order to apply the first differential data signal to the corresponding contact via the bridging capacitor.

11. A data cable for a bus system, comprising:
a first connector part comprising a first contact and a second contact, and
a second connector part comprising a first contact and a second contact,
wherein the first contact of the first connector part is electrically conductively connected to the first contact of the second connector part by a first electrical conductor,
wherein the second contact of the first connector part is electrically conductively connected to the second contact of the second connector part by a second electrical conductor,
wherein a fuse is respectively connected between the first contact of the first connector part and the first contact of the second connector part and/or between the second contact of the first connector part and the second contact of the second connector part, and
wherein a bridging capacitor is provided in parallel with the fuse to bridge the fuse when having been triggered.

12. The data cable according to claim 11, wherein a bridging capacitor is connected in parallel with one of the respective fuse(s).

13. The data cable according to claim 11, wherein a bridging capacitor connectable in parallel with one of the respective fuse(s) is provided, wherein said one of the respective fuse(s) is configured, upon triggering, to connect the connectable bridging capacitor in parallel.

14. The data cable according to claim 11, wherein a cable sheath enveloping the two electrical conductors is provided, said cable sheath being encapsulated by an injection-molding material.

15. A bus system, comprising:
a feed module, having a first DC voltage source,
a terminal for a data cable,
wherein the terminal comprises a first and a second contact,
wherein the first DC voltage source is connected to the first and second contacts via a first inductive assembly, such that a first electrical DC voltage can be applied to the first and second contacts by the first DC voltage source,
a physical interface for providing a first differential data signal,
wherein the physical interface is connected to the first and second contacts via a first transformer and a first capacitive assembly, in order to apply a first differential data signal to the first contact and to the second contact,
a load module, having a first DC voltage load,
a terminal for a data cable,
wherein the terminal comprises a first and a second contact,
wherein the first DC voltage load is connected to the first and second contacts via a first inductive assembly, such that the first DC voltage load may be supplied by a first electrical DC voltage applied to the first and second contacts,
a physical interface for receiving a first differential data signal,
wherein the physical interface is connected to the first and the second contacts via a first transformer and a first capacitive assembly, in order to receive a first differential data signal applied to the first contact and to the second contact,
a data cable connecting the feed module to the load module,
a first connector part comprising a first contact and a second contact, and
a second connector part comprising a first contact and a second contact,
wherein the first contact of the first connector part is electrically conductively connected to the first contact of the second connector part by a first electrical conductor,
wherein the second contact of the first connector part is electrically conductively connected to the second contact of the second connector part by a second electrical conductor,
wherein, in the feed module, a fuse is respectively connected between the first DC voltage source and at least the first contact and/or the second contact in any of the feed module and the load module, and/or
wherein, in the load module, a fuse is respectively connected between the first DC voltage load and at least the first contact and/or the second contact in any of the feed module and the load module, and/or
wherein, in the data cable, a fuse is respectively connected between the first contact of the first connector part and the first contact of the second connector part and/or between the second contact of the first connector part and the second contact of the second connector part in the data cable, and
wherein a bridging capacitor is provided in parallel with one of the respective fuse(s) to bridge the fuse(s) when the fuse(s) having been triggered.

16. The bus system according to claim 15, wherein a bridging capacitor is connected in parallel with one of the respective fuse(s).

17. The bus system according to claim 15, wherein a bridging capacitor connectable in parallel with one of the respective fuse(s) is provided, wherein said one of the respective fuse(s) is configured, upon triggering, to connect the connectable bridging capacitor in parallel.

18. The bus system according to claim 15, wherein the first differential data signal and/or respectively the second differential data signal are/is in each case differential Ethernet signal(s).

* * * * *